May 16, 1933.  B. BRONSON  1,908,681
VULCANIZING PRESS
Filed July 18, 1929
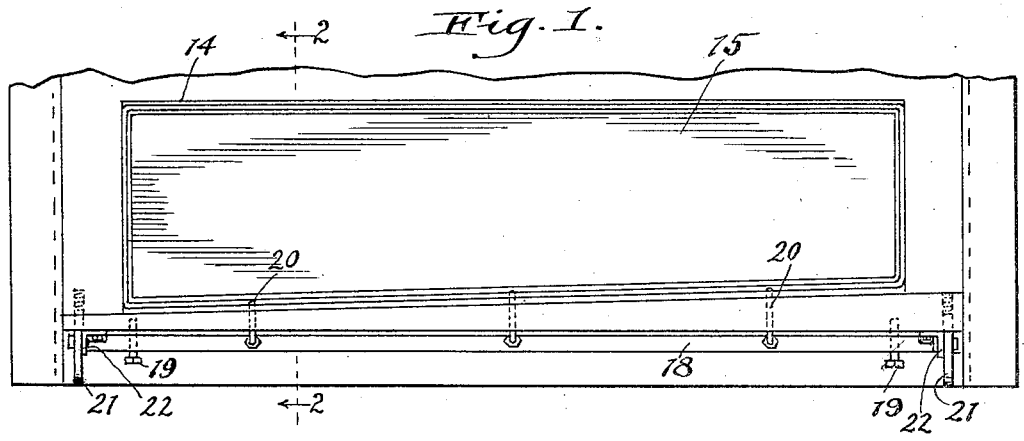
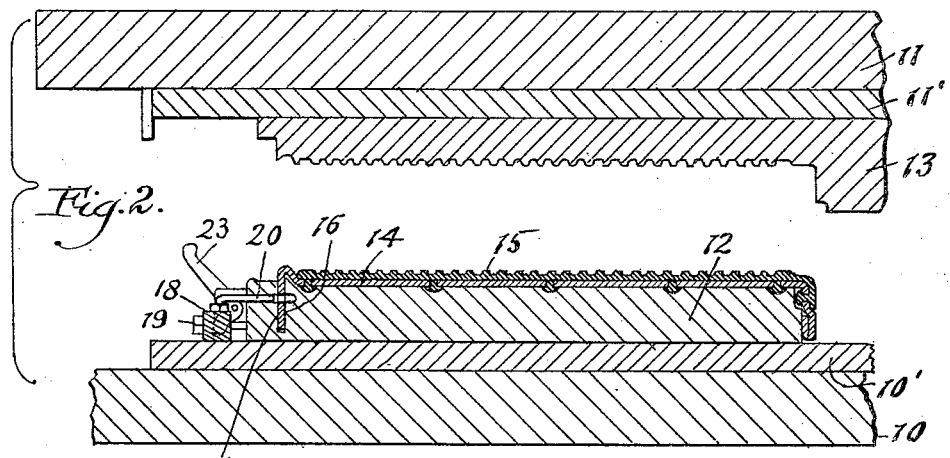
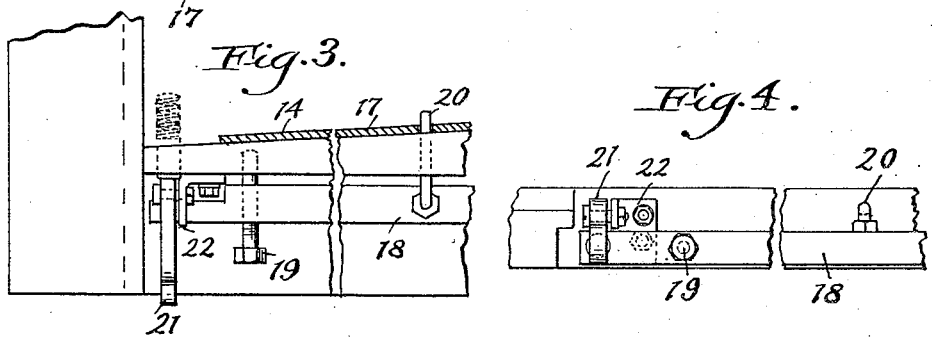
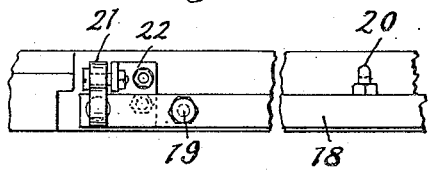
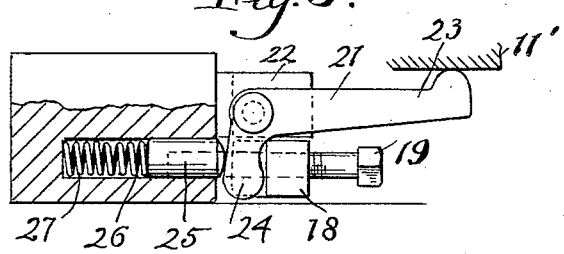

Patented May 16, 1933

1,908,681

UNITED STATES PATENT OFFICE

BUDD BRONSON, OF LAKEWOOD, OHIO, ASSIGNOR TO THE OHIO RUBBER COMPANY, OF CLEVELAND, OHIO, A CORPORATION OF OHIO

VULCANIZING PRESS

Application filed July 18, 1929. Serial No. 379,188.

This invention relates to presses and more particularly to presses of the type used for molding surface coverings to metal bodies.

Presses of this type may be used for molding various materials upon metal bodies, and are frequently use for molding and vulcanizing rubber in sheet form onto relatively large metal members, as for example runningboard bodies. Such presses are provided with a mold consisting of a bottom mold member, which engages the back of the runningboard body, and a top mold member having the desired configuration thereon, which engages the top of the runningboard body for molding and vulcanizing the rubber covering thereon.

In the operation of these presses the mold members are separated after the rubber covering has been vulcanized to the metal body, and as the mold members are separated the rubber covering of the body adheres to the top mold member, and there is a tendency for the body to be carried upwardly by this member as it moves away from the bottom mold member. When the rubber covering of the body adheres to the top mold member in this manner it is necessary to pry the body away from the top mold member, and frequently during the operation of separating the body from the top mold member, the article as well as the mold member are damaged. In addition to the probable damage to the mold member and to the articles, considerable time is required for extracting the finished articles, which materially slows up the production of the press.

It is therefore an object of this invention to provide an improved form of vulcanizing press in which means is provided for securing the body operated upon to one of the mold members until the other mold member has separated from the surface of the body.

Another object of this invention is to provide an improved form of vulcanizing press in which means is provided for locking the body operated upon to one of the mold members while the mold is closed, and for releasing the locking means after said mold members have separated.

The invention may be further briefly summarized as consisting in certain novel combinations and arrangements of parts hereinafter described and set out in the appended claims.

In the sheet of drawing forming a part of this application,

Figure 1 is a top plan view showing one of the mold members and the locking means associated therewith.

Fig. 2 is a sectional view taken on line 2—2 of Fig. 1, showing the mold members separated part way.

Fig. 3 is a fragmentary plan view showing one end of the locking means.

Fig. 4 is a fragmentary side elevational view of the locking means.

Fig. 5 is an end elevational view, with parts broken away, showing the means employed for releasing the locking means.

Referring now to the drawing for a detailed description of my invention, I show an improved form of press for vulcanizing a rubber covering to the surface of a metal body, in which locking means is provided for securing the body to one of the mold members until these members have separated. The locking device of my invention may be employed with various forms of vulcanizing presses, but for the purpose of illustration I have shown a press having a stationary bottom platen 10 with a mold plate 10' secured thereon, and a top platen 11 and top mold plate 11' which are reciprocably movable together relative to the bottom platen and bottom mold plate. This press is provided with a vulcanizing mold consisting of a bottom mold member 12 secured to the bottom mold plate 10' in any suitable manner, and a top mold member 13 which is secured to the movable mold plate 11'. These relatively movable mold members are arranged to be brought together so as to form a mold adapted to receive a metal body 14 for the purpose of vulcanizing a rubber covering 15 to this metal body. The bottom mold member 12 engages the back or under surface of the metal body, and is provided with a longitudinally extending groove 16 in which the flange 17 of the metal body, is received. The face of the top mold member 13 is provided with any desired pattern or configuration for molding and vulcanizing the covering 15 to the top surface of the metal body.

After the vulcanizing operation, the rubber covering of the body adheres to the surface of the top mold member, and tends to cause the body to be carried along with the top mold member when the mold members are separated. For the purpose of preventing the body from being carried along with the movable mold member, I provide means for locking or securing the body to the bottom mold member until the body has been stripped or broken away from the movable mold member. Any convenient form of locking or securing means may be employed for this purpose, but in this instance I have provided a form of locking means designed to take advantage of the perforations which have been previously formed in the flange 16.

This locking means, as illustrated in the drawing, consists of a movable bar 18 which extends along one edge of the bottom mold member, and is supported and guided by the studs 19 which pass through the bar. This movable bar is provided with spaced, laterally extending, locking members 20 which enter openings formed in the bottom mold member and extend through the perforations formed in flange 16 of the metal body.

At each end of the movable bar 18, I provide a bell-crank lever 21 which is pivotally mounted upon a bracket 22. Each of the bell-crank levers is provided with a long arm 23 which is adapted to be engaged adjacent its free end by the under face of the top mold plate 11', and a short arm 24 which extends between one face of the movable bar 18 and one end of a plunger 25 which is slidable in a laterally extending opening 26 formed in the bottom platen. A coil spring 27 is provided between the opposite or inner end of the plunger 25 and the bottom of the opening 26. This spring normally urges the plunger outwardly, and tends to turn the bell-crank lever on its pivot, so as to move the bar 18 laterally away from the mold member and thus retract the locking members 20 from engagement with the flange 16.

During the operation of the press the mold members are moved toward each other to close upon the metal body. During this closing movement, the lever 23 is engaged by the under surface of the top mold plate, and rotated about its pivot so as to compress the spring 27. While the mold members are in closed position the bar 18 is moved laterally toward the bottom mold member to cause the locking members 20 to extend through the perforations in the flange 16. Any suitable mechanism may be employed to move the members 20 into locking position, but in the embodiment of the invention illustrated, this operation is performed as a hand operation by the operator of the press.

After the vulcanizing operation has been completed the mold members begin to separate, and during the early part of this separating movement the locking members 20 are in position to lock the body to the bottom mold member, causing the body to be stripped or broken away from the upper mold member. As the opening movement of the mold members continues, the bell-crank lever is rotated about its axis by the spring 27, which rotation causes the bar 18 to be moved laterally away from the bottom mold member so as to withdraw the locking members 20 from the perforations in the flange 16.

It will now be readily seen that I have provided an improved form of press in which the work is locked or secured to one of the mold members until the other mold member has been separated from the lower mold member and from the work, thus insuring the separation of the work from both of the mold members so that the completed article can be quickly and easily removed from the press.

I have found in constructing rubber covered articles of the form shown in the drawing, that three spaced locking members extending through the flange along one edge of the article are sufficient to cause the article to be stripped or broken away, from the movable mold member but, obviously, similar locking members may also be employed along other edges of the article and likewise, for articles of different shapes, different arrangements of locking members may be employed.

While I have shown and described the apparatus of my invention in a detailed manner, it should be understood, however, that I do not limit myself to the precise details shown and described, but regard my invention as including such changes and modifications as do not involve a departure from the spirit of the invention and the scope of the appended claims.

Having thus described my invention, what I claim is:

1. A press of the character described comprising a pair of relatively movable cooperating mold members adapted to receive therebetween a body to be operated upon, and means for holding said body to one of said mold members to cause said body to separate from the other mold member, said means comprising a locking member, means supporting said locking member for sliding movement relative to said one mold member, and actuating means for sliding said locking member into locking cooperation with said body.

2. A press of the character described comprising a pair of relatively movable mold members adapted to receive a body to be operated upon having a marginal flange with an opening therethrough, and means for locking said body to one of said mold members, including a locking member adapted to enter the opening of said flange, and means for projecting said locking member into said opening.

3. A press of the character described comprising a pair of relatively movable mold members adapted to receive a flanged body to be operated upon, one of said mold members having a recess in which a flange of said body engages and a passage communicating with said recess, a member movable in said passage to engage the flange of said body for holding the latter to one of said mold members, and means for causing said movable member to be disengaged from said body after said mold members have separated.

4. A press of the character described comprising a mold formed of cooperating movable and stationary mold members and adapted to receive a flanged body to be operated upon, and locking means below the top surface of the stationary mold member adapted to be moved into engagement with a flange of said body for securing the latter to the stationary mold member.

5. A press of the character described comprising cooperating movable and stationary mold members adapted to receive therebetween a body to be operated upon, a movable member having means for locking said body to one of said mold members, spring means for actuating said movable member to release said locking means, and means for rendering said spring means ineffective until said mold members have separated.

6. In a press of the character described the combination of a pair of relatively movable mold members adapted to receive therebetween a body to be operated upon, one of said mold members having a recess therein, and means associated with said one mold member for separating said body from the other mold member, said means comprising a locking member movably positioned in said recess, means for moving said locking member into locking cooperation with said body, and means operable during separation of said mold members for moving said locking member out of locking cooperation with said body.

7. In a press of the character described the combination of a pair of relatively movable mold members adapted to receive therebetween a body to be operated upon, one of said mold members having a plurality of recesses in one edge thereof, a movably supported member extending along adjacent said one edge, and a plurality of locking members extending into said recesses, said locking members being carried by said movably supported member and adapted to be actuated by the latter into locking cooperation with said body.

In testimony whereof, I hereunto affix my signature.

BUDD BRONSON.